United States Patent

Wang

[11] Patent Number: 6,163,534
[45] Date of Patent: Dec. 19, 2000

[54] METHOD FOR DETERMINING THE SPEED OF A TERMINAL EQUIPMENT AND A RECEIVER

[75] Inventor: Ling Wang, Espoo, Finland

[73] Assignee: Nokia Telecommunications Oy, Espoo, Finland

[21] Appl. No.: 09/125,389

[22] PCT Filed: Feb. 18, 1997

[86] PCT No.: PCT/FI97/00102

§ 371 Date: Aug. 18, 1998

§ 102(e) Date: Aug. 18, 1998

[87] PCT Pub. No.: WO97/31497

PCT Pub. Date: Aug. 28, 1997

[30] Foreign Application Priority Data

Feb. 20, 1996 [FI] Finland ................................. 960769

[51] Int. Cl.$^7$ ................................................ H04B 7/212
[52] U.S. Cl. ........................................ 370/347; 455/441
[58] Field of Search .................................. 370/347, 345, 370/321, 337, 294, 328, 329, 332, 442; 455/437, 441, 443, 444, 226.2

[56] References Cited

U.S. PATENT DOCUMENTS

| | | | |
|---|---|---|---|
| 5,392,453 | 2/1995 | Gudmunson et al. | 455/444 |
| 5,396,253 | 3/1995 | Chia | 342/104 |
| 5,396,645 | 3/1995 | Huff | 455/441 |
| 5,457,810 | 10/1995 | Ivanov et al. | 455/441 |
| 5,491,834 | 2/1996 | Chia | 455/441 |
| 5,623,535 | 4/1997 | Leung et al. | 455/444 |
| 5,634,206 | 5/1997 | Reed et al. | 455/277.2 |
| 5,678,185 | 10/1997 | Chia | 455/437 |
| 5,711,005 | 1/1998 | Farrag | 455/441 |
| 5,722,072 | 2/1998 | Crichton et al. | 455/437 |

FOREIGN PATENT DOCUMENTS

92/12602 7/1992 WIPO.

OTHER PUBLICATIONS

IEEE Transaction on Vehicular Technology, vol. 43, No. 3, Aug. 1994, Mark d.Austin et al, "Velocity Adaptive Handoff Algorithms for Microcellular Systems".

Electronics Letters, Oct. 27, 1994 vol. 30, No. 22, pp. 1835, 1836.

*Primary Examiner*—Ajit Patel
*Assistant Examiner*—Brian Nguyen
*Attorney, Agent, or Firm*—Pillsbury Madison & Sutro

[57] ABSTRACT

A method and receiver for determining the speed of a terminal equipment in a radio system using a time division multiple access method in which a signal is transmitted in a succession of time slots each of a given duration and the signal is received and sampled, the received sampled signal having a signal envelope with a mean strength, in which the speed determination is made by measuring the man strength of the signal envelope of the received sampled signal within a given time window. The given time window has a duration that is at most half of the duration of a time slot, a parameter proportional to the mean strength of the signal envelope is formed during each time window, in each received time slot the parameter is measured by using at least two time windows, and a variation of the envelope is calculated by time slots on the basis of the parameter, to form a derived variation value, the derived variation value is averaged over several time slots to form an averaged variation value, and the averaged variation value is compared with a calculated reference value, which comparison indicates the speed of the equipment.

10 Claims, 2 Drawing Sheets

(12) United States Patent

METHOD FOR DETERMINING THE SPEED OF A TERMINAL EQUIPMENT AND A RECEIVER

This application is the national phase of international application PCT/FI97/00102 filed Feb. 18, 1997 which designated the U.S.

FIELD OF THE INVENTION

The present invention relates to a method for determining the speed of a terminal equipment in a radio system using a time division multiple access method, which method comprises measuring the mean strength of the envelope of a received sampled signal within a given time window.

BACKGROUND OF THE INVENTION

The present invention is suitable for use especially in cellular radio systems and also in other digital radio systems where terminal equipments communicating with base stations move beyond cell boundaries. Information on the moving speed of the terminal equipment will make it essentially easier to manage resources of the radio system, such as handover anticipation and power control optimization.

For example, in a system using small microcells and bigger, so-called umbrella cells overlapping microcells, it is advantageous that fast moving terminal equipments are connected to umbrella cells and slowly moving or stationary terminal equipments to smaller microcells. In this way it is possible to diminish significantly the number of required handovers and thus signalling loading in the network.

One known solution for determining the speed of a mobile terminal equipment is to monitor Doppler shift of carrier frequency. This method is, however, impractical as it requires a stable frequency reference source which is expensive.

Another known method has been described in Doumi T., Gardiner J. G., Use of base station diversity for mobile speed estimation, *Electronic Letters*, Vol. 30, No. 22, pp. 1835–1836. The method of the reference cited utilizes base station antenna diversity. The antenna providing the strongest signal level is always selected for diversity. The frequency shift of the antenna is proportional to Doppler shift on the basis of which the speed of the equipment can be deduced.

U.S. Pat. No. 5,396,645 describes a method for measuring the speed of an equipment. In the method of the reference cited, variations of the strength of a received signal are measured during a predetermined time interval and the speed of the equipment is deduced on the basis of this variation.

None of the known methods is, however, suitable in a TDMA radio system where frequency hopping is used, that is, where the carrier frequency used by the user of the equipments varies by time slots in accordance with some given variance pattern.

CHARACTERISTICS OF THE INVENTION

The object of the present invention is to implement a determination method of the speed of an equipment which is suitable to be used in TDMA systems and in connection with frequency hopping as well as without frequency hopping.

This will be attained by a method shown in the preamble which is characterized in that the given time window is at most half a time slot in length, that a parameter proportional to the mean strength of the signal envelope is formed during each time window, that in each received time slot the parameter is measured by using at least two time windows, and that the variation of the envelope is calculated by time slots on the basis of the parameter, that the derived variation value is averaged over several time slots, and that the averaged variation value is compared with the calculated reference value, which comparison indicates the speed of the equipment.

The invention also relates to a receiver in a radio system using a time division multiple access method, which receiver comprises means for sampling the received signal. The receiver of the invention is characterized in that the receiver comprises means for forming a parameter proportional to the mean strength of the signal envelope during a time window at most half a time slot in length, in each received time slot by using at least two time windows, and means for calculating the variation of the envelope by time slots on the basis of the parameter, and for averaging the derived variation value over several time slots, and means for comparing the averaged variation value with the calculated reference value, and for indicating the speed of the equipment.

The method of the invention has many advantages. The first preferred embodiment of the invention utilizing partial sample queues is suitable for use in propagation conditions where a plurality of interferences is present in the radio channel. The second preferred embodiment of the invention is suitable for use in a channel with less interference and it is correspondingly simpler to implement than the first embodiment.

BRIEF DESCRIPTION OF THE FIGURES

In the following, the preferred embodiment of the invention will be explained in more detail by means of the appended drawings, wherein.

DESCRIPTION OF THE PREFERRED EMBODIMENTS

Figure 1:
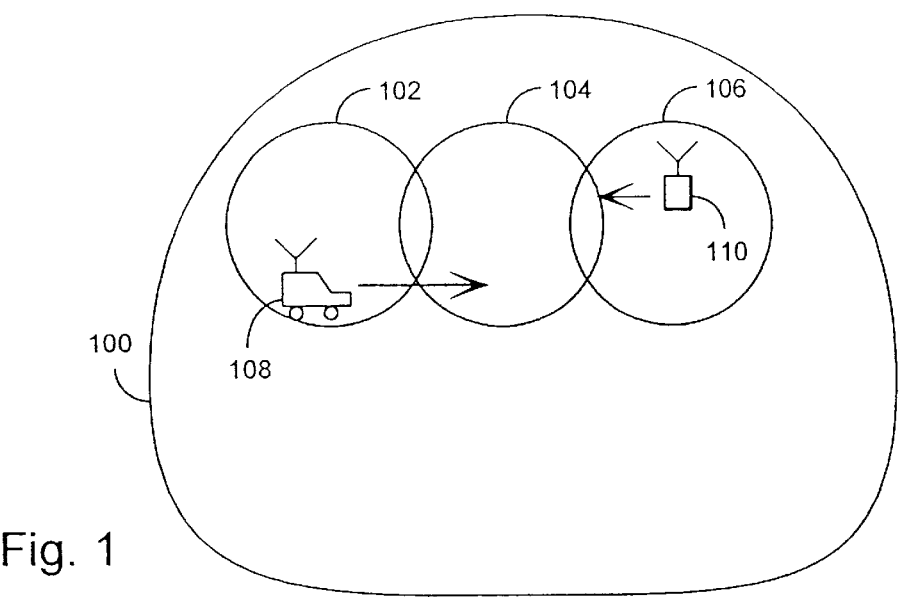
FIG. 1 illustrates an example of a cellular radio system where the system of the invention can be implemented.

FIG. 1 illustrates an example of a cellular radio system where the system of the invention can be implemented. The figure shows a set of small, so-called microcells 102 to 106 and a big umbrella cell 100 overlapping them. Each cell is typically served by a specific base station equipment. Microcells are intended for slowly moving or stationary terminal equipments 110, for walkers, for example. An umbrella cell serves fast moving terminal equipments 108 placed in vehicles, for example. In order that the terminal equipments can be maintained in correct types of cells, it is important to determine their moving speed. It should be noted that the method of the invention may naturally be applied to other radio system types, such as the GSM system where overlapping microcells and umbrella cells are not yet in use.

When a terminal equipment having a connection to a base station moves, the strength of the signal received from the terminal equipment by the base station varies due to fast fading. It is previously known that the variation of the signal envelope is proportional to the speed of the terminal equipment.

In a cellular radio environment, a radio channel may be described as a non-dispersive channel of a single propagation path or a multipath propagating dispersive channel, depending on how the signal passing through the channel is delayed and spread in time domain. In the latter channel, the multipath propagation of the signal and great delay deviation lead to intersymbol interferences (ISI) of the received symbols.

When a signal propagates through a dispersive multipath channel, mainly two interference types white Gaussian distributed noise (AWGN) and intersymbol interferences (ISI), can be detected in the envelope of the received signal. When a signal propagates in a non-dispersive single path channel, white noise is the main interference.

The first preferred embodiment of the invention will be examined first. This embodiment is suitable for use in an environment where a signal propagates through a dispersive multipath channel. The preferred feature of the invention is that on the basis of it, both the effect of ISI and noise can be removed from the signal envelope without any change to the effect of fast fading on the envelope.

Figure 2:
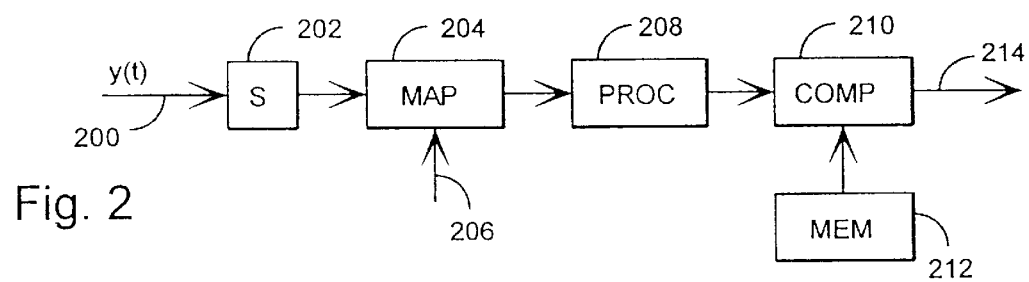
FIG. 2 illustrates an example of the structure of the receiver of the first preferred embodiment of the invention.

The solution of the invention will be now examined by means of the block diagram shown in FIG. 2. In the solution of the invention, speed is estimated on the basis of the variation of the envelope. In order that the effect of noise and ISS could be removed, partial sample queues and their means are employed in this embodiment of the invention. Because of frequency hopping, the variation of the envelope is examined within each time slot.

A received signal 200 is sampled in a prior art sampling means 202 and partial sample queues are formed 204 in a manner to be explained below. The sampling speed may be one sample per each symbol, for example. The mean strength of the signal envelope is calculated by using a time window which is at most half a time slot in length. In each time slot the mean strength of the envelope is calculated in a processor 208 by using at least two time windows on the basis of which the mean variation of the envelope in the time slot is calculated. The mean envelope variation value thus obtained is averaged further over several time slots. By denoting the mean variation value of the envelope by D and the received signal by y(t,i) where i indicates the $i^{th}$ time slot, the calculation can be illustrated by the appended exemplary formula having two time windows for a time slot:

$$D = \frac{1}{N} \sum_{i=0}^{N-1} \left[ \frac{1}{M} \sum_{j=0}^{M-1} (\overline{y}_{queue1}(t,j,i)) - (\overline{y}_{queue2}(t,j,i)) \right]^2,$$

where

N=the number of time slots,

M=the number of sample queues within one time slot, j=the $j^{th}$ sample queue, $\overline{y}_{queue1}(t,j,i)$=the mean comprised by the sample queue in the first time window, and $\overline{y}_{queue2}(t,j,i)$=the mean comprised by the sample queue in the second time window.

The averaged variation value D is compared in a processor 210 in advance with theoretical reference values stored in some memory element 212, as a result of which comparison a speed 214 of the terminal equipment will be found out. In a practical implementation the processors 208 and 210 may be the same processor or a different processor, or a corresponding calculation may be realized by dedicated logic, as is evident to those skilled in the art.

We shall next examine the forming of partial sample queues in a signal which is first phase modulated. As in the GSM system, an interference caused by ISI is a result of symbols with different phases adding together. As ISI affects only a finite number of adjacent symbols and phase modulation has a finite number of phases (such as four phases in MSK), it may be seen that the sample points of some envelope have gone through an equally slow fading. The samples with an equally fast fading are selected as points of the partial sample queue. In this case there is no interference caused by ISI within the partial sample queue.

Figure 3:
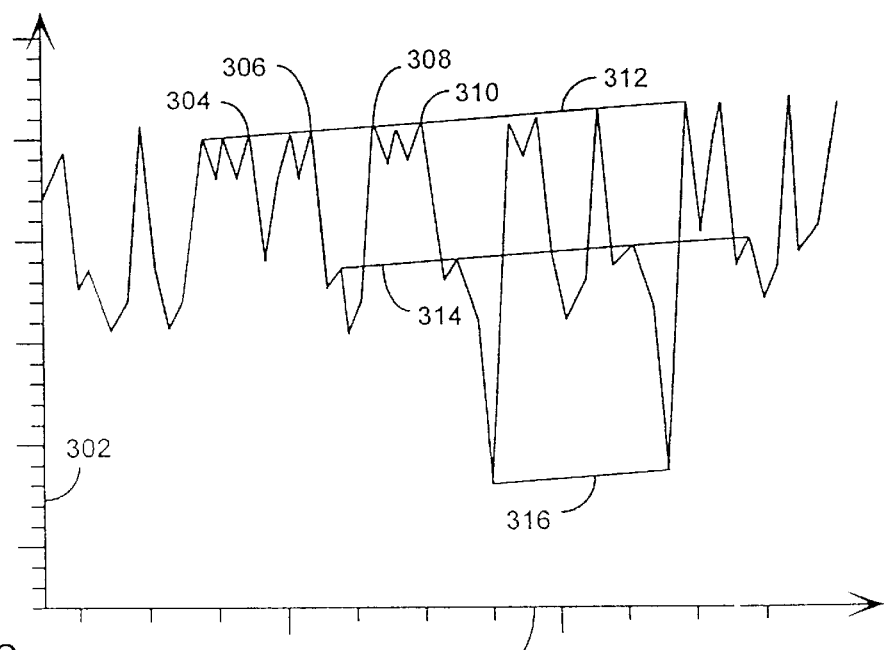
FIG. 3 illustrates an example of the selection of the partial sample queue.

The forming of a partial sample queue is illustrated in FIG. 3. The figure shows some of the samples in one time slot. The index of the samples is on horizontal axis 300, the strength of the envelope on vertical axis 302 from which the effect of noise is removed. In the example shown in the figure, a group of sample points 304 to 310 has gone through a similar fast fading, for which reason a partial sample queue 312 can be formed of them. Similarly, part samples queues 312 and 316 can be formed of other points. The sample numbers of different partial sample queues may be unequal.

Figure 4:
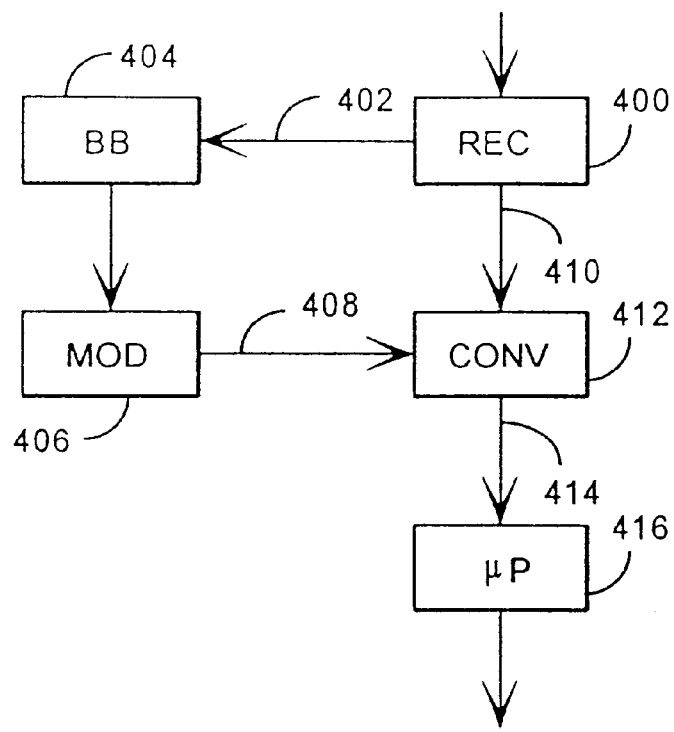
FIG. 4 illustrates a diagram of calculating the partial sample queue.

Because of noise, partial sample queues cannot be selected directly from a received sampled signal but the signal has to be regenerated before the partial sample queue is selected. The regeneration of a signal is illustrated in the diagram of FIG. 4. The diagram shows more precisely the contents of block 204 in FIG. 2. The sampled signal is carried to a detector 400 which makes a hard decision for detecting the symbol. Hard decisions 202 are conveyed to a burst modifier 204 from which the burst formed of the symbols is further conducted to a modulator 406. The signal thus obtained is carried to a calculation processor 412 in which an estimated channel function 410 is received from the detector as a second input. The processor carries out a convolution between the modulated signal and the channel function, from which a regenerated signal 414 is derived. This signal is further conveyed to a calculation processor 416 that searches the partial sample queues.

The found partial sample queues are mapped onto the envelope of the received signal. The following example will be examined. It is assumed that the received signal is y(t,i) and the regenerated signal is s(t,i), both containing 148 samples $[y_1, y_2, \ldots y_{148}]$ and $[s_1, s_2, \ldots s_{148}]$ in one time slot. It is assumed that a partial sample queue $[s_5=s_{23}=s_{89}=s_{121}]$ has been found from the regenerated sample queue. This means that $s_5=s_{23}=s_{89}=s_{121}$. In accordance with the formula of D shown above then $\overline{y}_{queue1}(t,j,i)=(y_5+y_{23})/2$ and $\overline{y}_{queue2}(t,j,i)=(y_{89}+y_{121})/2$.

We shall now examine the second preferred embodiment of the invention suitable for use in an environment where a signal propagates through a non-dispersive single path channel. The preferred feature of the invention is that its implementation is simpler than that of the above solution utilizing partial sample queues.

Figure 5:
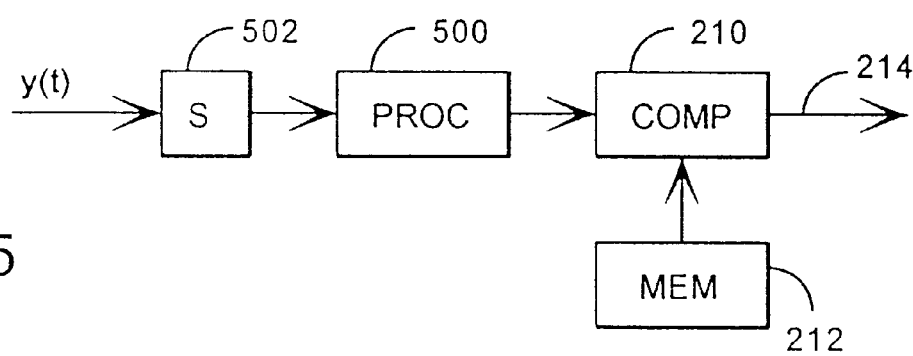
FIG. 5 illustrates an example of the structure of the receiver of the second preferred embodiment of the invention.

Let us examine the solution of the invention by means of the diagram shown in FIG. 5. In the solution of the invention, the speed is estimated on the basis of variation of the envelope. The effect of ISI is not taken into account in this solution model as it is not present on a non-dispersive channel. As above, because of frequency hopping, variation of the envelope is examined within each time slot.

Samples 502 are taken from the received signal 200. The sampling speed may be, for example, one sample for each symbol. The mean strength of the signal envelope is calculated by using a time window which is at most half a time slot in length. The mean strength of the envelope is calculated in each received time slot by using at least two time windows, on the basis of which the mean variation of the envelope in the time slot is calculated in a processor 500. The mean envelope variation value thus obtained is averaged further over several time slots. By denoting the mean variation value of the envelope by D and the received signal by y(t,i) where i indicates the $i^{th}$ time slot, the calculation can be illustrated by the appended exemplary formula having two time windows for a time slot:

$$D = \frac{1}{N} \sum_{i=0}^{N-1} [\bar{y}_1(t, j) - (\bar{y}_2(t, j)]^2,$$

where

N=the number of time slots, $\bar{y}_{queue1}(t,j,i)$=the mean in the first time window, and $\bar{y}_{queue2}(t,j,i)$=the mean in the second time window.

The averaged variation value D is compared in the processor 210 in advance with some theoretical reference values stored in the memory element 212, as a result of which the speed 214 of the terminal equipment is found out. In a practical implementation the processors 500 and 219 may be the same processor or a different processor, or a corresponding calculation may be implemented by dedicated logic, as is evident to those skilled in the art.

As distinct from the embodiment presented first, in this implementation the strength of the envelope is calculated by means of all the samples placed in the time window, whereas partial sample queues were formed in the first embodiment.

The structures shown in both FIG. 2 and FIG. 5 are examples of receiver structures of the invention only in parts essential for the invention. The receivers of the invention obviously comprise other components than the ones shown in the figure, such as an antenna, radio frequency parts and filters, as is evident to those skilled in the art.

Although the invention has been above explained with reference to the example of the accompanying drawings, it is evident that the invention is not restricted thereto but it may be varied in many ways within the inventive idea disclosed in the appended claims.

What is claimed is:

1. A method for determining the speed of a terminal equipment in a radio system using a time division multiple access method in which a signal is transmitted in a succession of time slots each of a given duration and the signal is received and sampled, the received sampled signal having a signal envelope with a mean strength, which method comprises measuring the mean strength of the signal envelope of the received sampled signal within a given time window, characterized in that the given time window has a duration that is at most half of the duration of a time slot, a parameter proportional to the mean strength of the signal envelope is formed during each time window, in each received time slot the parameter is measured by using at least two time windows, and a variation of the envelope is calculated by time slots on the basis of the parameter, to form a derived variation value, the derived variation value is averaged over several time slots to form an averaged variation value, and the averaged variation value is compared with a calculated reference value, which comparison indicates the speed of the equipment.

2. A method according to claim 1, characterized in that the parameter proportional to the mean strength of the signal envelope is calculated by forming one or more partial sample queues of the samples of the received signal, the mean strength being calculated for each partial queue.

3. A method according to claim 2, characterized in that each partial sample queue is formed of the samples of the envelope whose fast fading is equal.

4. A method according to claim 3, characterized in that the partial sample queue is formed of a regenerated signal in which decision, modulation and multiplication of channel impulse response have been carried out.

5. A method according to claim 1, characterized in that the parameter proportional to the mean strength of the signal envelope is calculated by averaging the measured strength of all the samples in the time slot.

6. A receiver for determining the speed of a terminal equipment in a radio system using a time division mutiple access method in which a signal is transmitted in a succession of time slots each of a given duration, which receiver comprises means for receiving the transmitted signal and sampling the received signal such that the received sampled signal has a signal envelope with a mean strength, characterized in that the receiver comprises means for forming a parameter proportional to the mean strength of the signal envelope during at least two given two windows each having a duration at most equal to half the duration of a time slot, in each time slot of the received signal, means for calculating the variation of the envelope by time slots on the basis of the parameter to form a derived variation value, and for averaging the derived variation value over several time slots, and means for comparing the averaged variation value with a calculated reference value, and for indicating the speed of the equipment.

7. A receiver according to claim 6, characterized in that the receiver comprises means for forming one or more partial sample queues of the received signal, and means for calculating the mean strength for each partial queue.

8. A receiver according to claim 7, characterized in that the receiver comprises means for forming each partial queue of the samples of the received signals whose fast fading is equal.

9. A receiver according to claim 8, characterized in that the means for forming one or more partial sample queues comprise means for detecting the received signal, means for assembling bursts of detected symbols, means for modulating the assembled bursts, means for multiplying the modulated assembled bursts by channel impulse response and means for finding the partial sample queues from the multiplied signal.

10. A receiver according to claim 6, characterized in that the receiver comprises means for measuring the strength of all of signal samples in each time slot, and in that that the means for forming a parameter proportional to the mean strength of the signal envelope forms the parameter by averaging the measured strength of all the samples in each time slot.

* * * * *